(12) United States Patent
Sofia et al.

(10) Patent No.: US 11,501,014 B2
(45) Date of Patent: Nov. 15, 2022

(54) SECURE DATA REPLICATION IN DISTRIBUTED DATA STORAGE ENVIRONMENTS

(71) Applicant: INTERNATIONAL BUSINESS MACHINES CORPORATION, Armonk, NY (US)

(72) Inventors: Anthony Thomas Sofia, Hopewell Junction, NY (US); Jason G. Katonica, Poughkeepsie, NY (US); Trent Matthew Balta, Poughkeepsie, NY (US); Michael Terrence Cohoon, Fishkill, NY (US); Torin Reilly, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

(21) Appl. No.: 16/868,902

(22) Filed: May 7, 2020

(65) Prior Publication Data

US 2021/0350015 A1 Nov. 11, 2021

(51) Int. Cl.
*G06F 21/62* (2013.01)
*G06F 16/22* (2019.01)
*G06F 16/27* (2019.01)
*G06F 16/23* (2019.01)

(52) U.S. Cl.
CPC ...... *G06F 21/6227* (2013.01); *G06F 16/2282* (2019.01); *G06F 16/2322* (2019.01); *G06F 16/2358* (2019.01); *G06F 16/27* (2019.01)

(58) Field of Classification Search
CPC ............................ G06F 21/6227; G06F 16/27

USPC ......................................................... 726/26
See application file for complete search history.

(56) References Cited

U.S. PATENT DOCUMENTS

| 7,555,493 | B2 | 6/2009 | Khayter |
| 9,436,724 | B2 | 9/2016 | Driesen et al. |
| 9,703,799 | B2 | 7/2017 | Kuruganti |
| 2002/0114451 | A1* | 8/2002 | Satterfield ............. H04L 9/0618 380/37 |

(Continued)

FOREIGN PATENT DOCUMENTS

WO 02073432 A1 9/2002

OTHER PUBLICATIONS

PCT International Search Report and Written Opinion; dated Jul. 30, 2021; Application No. PCT/CN2021/090245; Filed: Apr. 27, 2021; 10 pages.

*Primary Examiner* — Muluemebet Gurmu
(74) *Attorney, Agent, or Firm* — Cantor Colburn LLP; Edward Wixted

(57) ABSTRACT

A described method includes receiving, by a database system, an instruction to change a first data element in a table in a database, which includes a first copy and a second copy of the table. A first entry is created in a first change-table. The first entry includes an updated value for a first data element. A second entry is created in a second change-table. Creating the second entry includes, changing the updated value into a ciphertext if the first data element is secured, and storing the ciphertext into the second entry. If the first data element is non-secured, the updated value is stored into the second entry as is. The second copy of the table is modified using the second change-table. The second copy of the table is used to respond to subsequent queries.

20 Claims, 8 Drawing Sheets

(56) References Cited

U.S. PATENT DOCUMENTS

| | | | |
|---|---|---|---|
| 2014/0325217 A1* | 10/2014 | Mori | G06F 21/62 |
| | | | 713/165 |
| 2015/0112923 A1* | 4/2015 | Driesen | G06F 16/2379 |
| | | | 707/609 |
| 2018/0241561 A1* | 8/2018 | Albertson | H04L 63/06 |
| 2019/0171650 A1 | 6/2019 | Botev | |
| 2020/0012659 A1 | 1/2020 | Dageville et al. | |

* cited by examiner

SECURE DATA REPLICATION IN DISTRIBUTED DATA STORAGE ENVIRONMENTS

BACKGROUND

The present invention generally relates to computing technology, and more particularly, to a database management system that manages storage of electronic data in a distributed database system in a secured manner.

Data replication is the frequent electronic copying of data records stored on a source data store to a replica data store, either for data recovery or to allow users on multiple computing devices to access data relevant to their tasks without interfering with the work of others. In data storage systems, it is often desirable to have stored data replicated in multiple locations so that the data is available locally in each of the locations. Each location will have a local data storage device, which can satisfy requests to read data on its own, i.e., without needing to query other data storage devices of the data storage system.

SUMMARY

According to one or more embodiments of the present invention, a computer-implemented method for secure data replication in data storage environments includes receiving, by a database system, an instruction to change a first data element in a table that is in a database. The database includes a first copy of the table and a second copy of the table. The method further includes, in response to receiving the instruction, creating a first entry in a first change-table. The first entry includes data elements including an updated value for the first data element. The updated value is provided by the instruction. Further, the method includes creating a second entry in a second change-table. Creating the second entry includes, in response to determining that the first data element is a secured data element, changing the updated value into a ciphertext using a security algorithm, and storing the ciphertext into the second entry as content of the first data element in the second change-table. Further, in response to determining that the first data element is a non-secured data element, the updated value is stored into the second entry as content of the first data element of the second change-table. The method further includes modifying, by the database system, the second copy of the table according to the instruction that is received using the second change-table, wherein the second table is used to respond to subsequent queries.

According to one or more embodiments of the present invention, a database system includes a memory device, and one or more processors coupled with the memory device. The one or more processors perform a method for secure data replication in a database, wherein the database includes a first copy of a table and a second copy of the table. The method includes receiving an instruction to change a first data element in the table. The method further includes, in response to receiving the instruction, creating a first entry in a first change-table. The first entry includes data elements including an updated value for the first data element. The updated value is provided by the instruction. Further, the method includes creating a second entry in a second change-table. Creating the second entry includes, in response to determining that the first data element is a secured data element, changing the updated value into a ciphertext using a security algorithm, and storing the ciphertext into the second entry as content of the first data element in the second change-table. Further, in response to determining that the first data element is a non-secured data element, the updated value is stored into the second entry as content of the first data element of the second change-table. The method further includes modifying, by the database system, the second copy of the table according to the instruction that is received using the second change-table, wherein the second table is used to respond to subsequent queries.

According to one or more embodiments of the present invention, a computer program product includes a storage medium readable by one or more processing circuits. The storage medium includes instructions executable by the one or more processing circuits to perform a method for secure data replication in a database, wherein the database includes a first copy of a table and a second copy of the table. The method includes receiving an instruction to change a first data element in the table. The method further includes, in response to receiving the instruction, creating a first entry in a first change-table. The first entry includes data elements including an updated value for the first data element. The updated value is provided by the instruction. Further, the method includes creating a second entry in a second change-table. Creating the second entry includes, in response to determining that the first data element is a secured data element, changing the updated value into a ciphertext using a security algorithm, and storing the ciphertext into the second entry as content of the first data element in the second change-table. Further, in response to determining that the first data element is a non-secured data element, the updated value is stored into the second entry as content of the first data element of the second change-table. The method further includes modifying, by the database system, the second copy of the table according to the instruction that is received using the second change-table, wherein the second table is used to respond to subsequent queries.

Additional technical features and benefits are realized through the techniques of the present invention. Embodiments and aspects of the invention are described in detail herein and are considered a part of the claimed subject matter. For a better understanding, refer to the detailed description and to the drawings.

The diagrams depicted herein are illustrative. There can be many variations to the diagrams or to the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All of these variations are considered a part of the specification.

DETAILED DESCRIPTION

Example embodiments of the present invention relate to, among other things, devices, systems, methods, computer-readable media, techniques, and methodologies for improving a database system. Change data capture technology is used in order to keep a database system synchronized with low latency. For such change data capture, the database system replicates instructions to change one or more data elements in the database. For example, such instructions to change a data element can include instructions to INSERT, UPDATE, and DELETE a data element. In a database system that implements change data capture, such instructions change the data element(s) between a target database and a replica database. Embodiments of the present invention further improve such distributed database systems that have replicas of the stored data by facilitating secure updates to the stored data when using the change data capture. One or more embodiments of the present invention facilitate transforming a field being updated into secured data, which can then be applied transparently through the existing replication process. During the application of the changes, a source change table and a target change table are synchronized to ensure that the secure data is stored in the database.

Change data capture includes capturing data from a database update log and capturing the update-records into a change-table with updated records as well as metadata. The change-table is then used to apply only the updated records into a replica of the original database.

Figure 1:
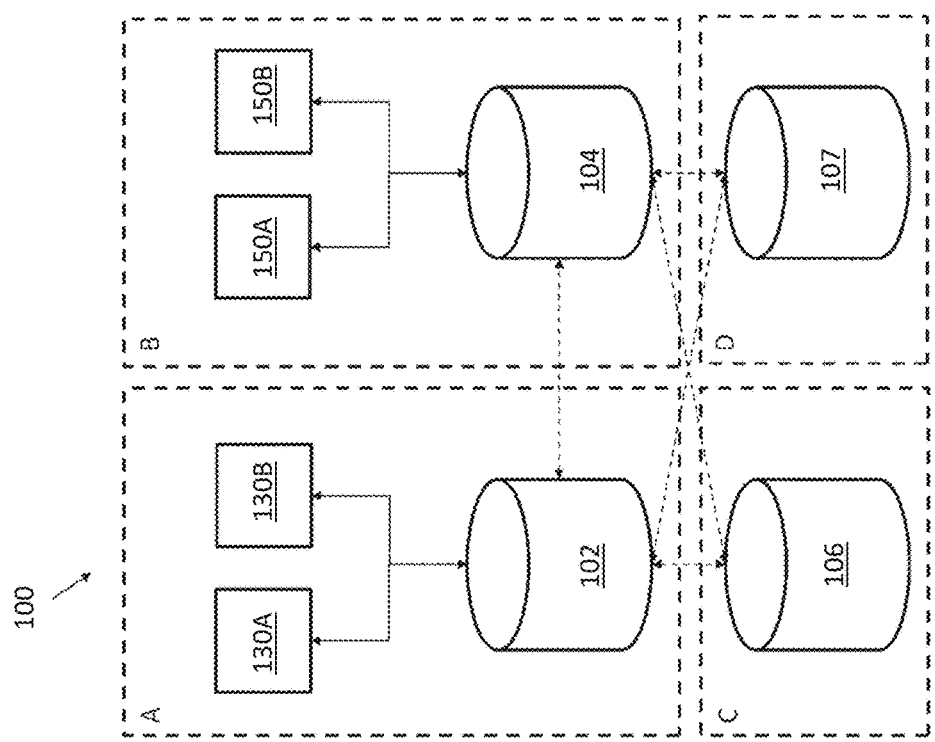
FIG. 1 is a schematic diagram of a data storage system in accordance with one illustrative embodiment of the present invention.

FIG. 1 depicts a database system that implements change data capture according to one or more embodiments of the present invention. The database system 100 includes at site A, a first data storage device 102 and host devices 130A and 130B, amongst others, in communication with the first data storage device 102. The host devices 130A and 130B make requests to read data from and write data to the first data storage device 102. The database system 100 further includes, at a site B, a second data storage device 104 and host devices 150A and 150B, amongst others, in communication with the second data storage device 104. Similarly, the host devices 150A and 150B make requests to read data from and write data to the second data storage device 104.

The first data storage device 102 and second data storage device 104 are in communication with each other so that the data they store, including any updates to the data made by requests to write data, is replicated at each of sites A and B.

The database system 100 further includes, at a site C, a third data storage device 106, and, at a site D, a fourth data storage device 107. Unlike the first data storage device 102 at site A and the second data storage device 104 at site B, the third data storage device 106 and fourth data storage device 107 are not in communication with any host devices. As a result, the third data storage device 106 and fourth data storage device 107 will not receive any requests to read or write data. Such sites with data storage devices that are not themselves receiving write requests from host devices, and so are merely acting as copies of data stored elsewhere, are described herein as non-active sites.

However, the third data storage device 106 and fourth data storage device 107 are each in communication with the first data storage device 102 and the second data storage device 104, and each replicates the data stored at each of site A and B. In use, the third data storage device 106 and fourth data storage device 107 might, for example, be maintained while the migration is being done from one site to another (e.g., from site A to site C), while site A is remaining in active use; or to provide a backup for use in the case one of the first data storage device 102 or second data storage device 104 fails.

While in the embodiment shown in FIG. 1 the third data storage device 106 and fourth data storage device 107 are located at different sites from the first data storage device 102 and the second data storage device 104, in alternative embodiments one or both may be located at the same site as first data storage device 102 or the second data storage device 104. Further, while in the embodiment shown in FIG. 1, site A and site B, each includes only a single data storage device in communication with host devices, in other alternative embodiments sites may include multiple data storage devices in communication with one or more host devices.

The first data storage device 102 and second data storage device 104 can replicate data between themselves.

It is understood that the shown data storage devices and sites are just one example embodiment of the present invention and that in other embodiments of the present invention, the number of sites, storage devices, and their organization can vary from the depicted example.

Figure 2:
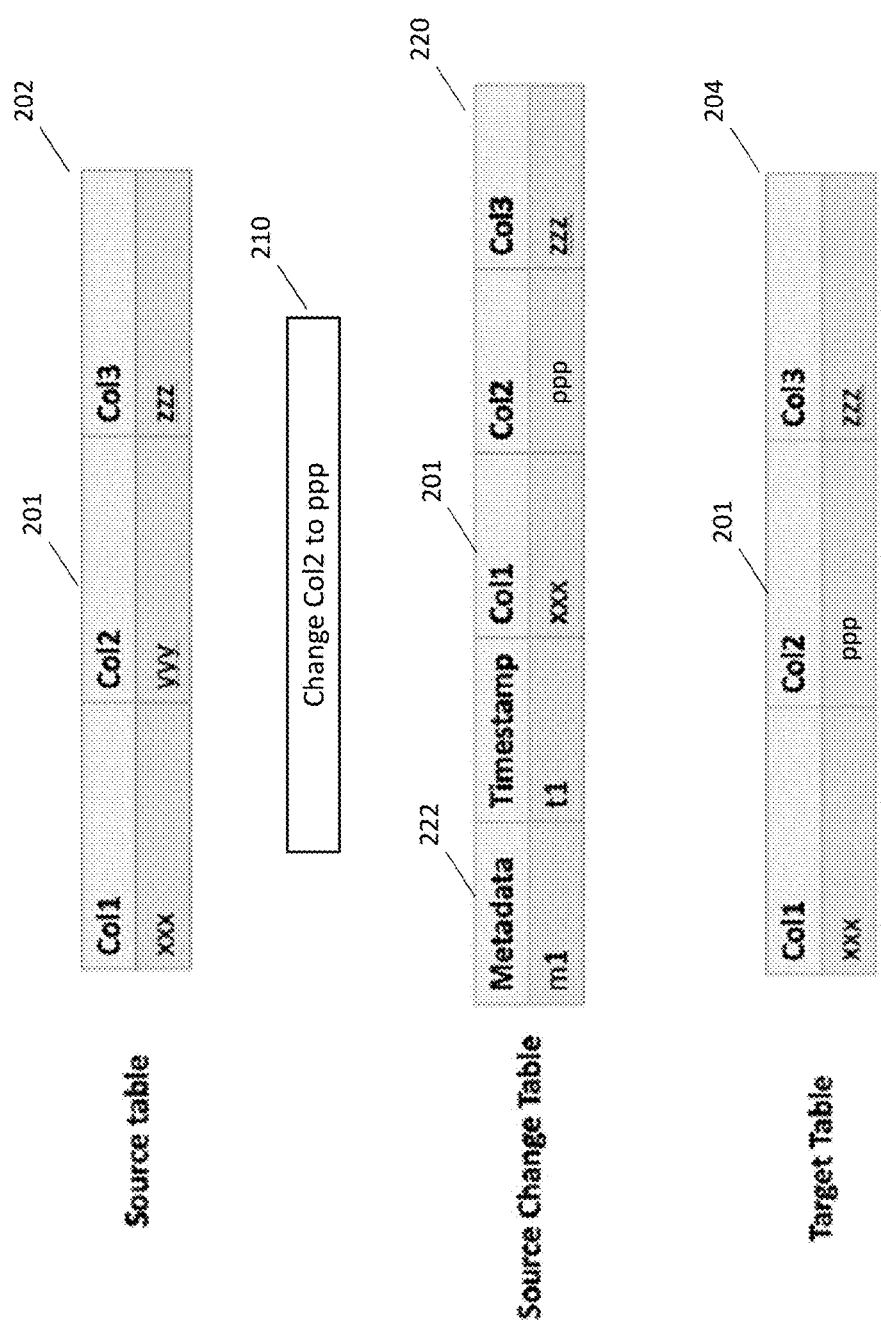
FIG. 2 depicts a block diagram and operational flow for changing a data element in a data storage device.

FIG. 2 depicts a block diagram and operational flow for changing a data element in a data storage device. In the depicted example, the first data storage device 102 is illustrated; however, it is understood that any other storage device can be operated in the same manner. Further, it is understood that although, in the examples described herein, the data storage device stores data using a table data structure, the data storage device can store the data using other types of data structures, which can also be updated in substantially the same manner as a table. A data element can be a particular data field, i.e., a cell represented by a particular row-column combination. Alternatively, or in addition, a data element can be an entire row or an entire column in the table.

It should be noted that figures herein depict a target table being changed per example requests. It is understood that the changes are also being made in a source table. While the target table is shown with the change, the change is not shown in the source table so as to depict to the reader, the two states of the data—before the request (in the source table), and after the request completes (in the target table). The database system 100 implements the changes in the target table if the request is first hardened in the source table. Accordingly, the figures herein depict the mechanics of an update to the source table that triggers the replication in the target table, however, changes to the source table itself are not depicted herein, and it should be understood that such changes are made by the database system without affecting the technical solutions provided by one or more embodiments of the present invention.

Consider, in the example scenario of FIG. 2, that the source table 202 includes data elements, and that one or more data elements are to be updated by an instruction 210. In the example scenario herein, the data element 201 being changed is the field represented by row-1, col-2, such that the existing value of "yyy" is being changed to "ppp." It should be further noted that the data values can be different in other embodiments of the present invention. Also, the number of rows and columns in table 202 is exemplary and that in one or more embodiments of the present invention the table 202 can include a different number of rows and columns. Further yet, while the example scenario depicts an "update" operation that changes an existing value, in one or more embodiments of the present invention, the change can include inserting a new value.

Referring to the example scenario, the instruction 210 changes the source table 202 to a target table 204. For changing the data per the instruction 210, by using data change capture techniques, the database system 100 creates a change-table 220 in response to the instruction 210. The change-table 220 is an intermediate data structure that stores update-records. The update-records that are stored in the change-table 220 contain the values that are going to be applied to the target table 204. The database system 100 subsequently uses an apply process that transforms the data elements that are to be updated; in this case, the data element 201. In one or more embodiments of the present invention, the data elements that are to be updated are noted in a metadata portion 222 of the change-table 220. In one or more embodiments of the present invention, the metadata portion 222 can further indicate an operation that is to be performed for the change to be applied. The change-table 220 can store several such changes that are to be applied to the target table 204. The database system 100 executes one or more computer-executable instructions to apply these changes at a later time. The changes can be applied in a sequential manner in one or more embodiments of the present invention. Alternatively, in one or more embodiments of the present invention, the database system 100 applies the changes in a more efficient out-of-order manner, by analyzing the changes being made, and skipping any redundant changes.

However, technical challenges exist with such change capture techniques when applied to a distributed database system 100 when the data elements are to be secured, such as by encryption, masking, or any other technique to secure the values stored in the database system 100. For example, when a data element is to be updated, the change-table 220 can include values for the data element that is to be applied to the target table 204. These values are not secured in existing systems, and hence, are vulnerable. Here, "value" of the data element can also be referred to as the "content" of the data element.

Such technical challenges are addressed by one or more embodiments of the present invention. Embodiments of the present invention facilitate protecting each data element in the change-tables that are going to be applied to the target table 204. In one or more embodiments of the present invention, the data elements are transformed into secured data, and such secured data is then applied to the target table 204 using existing replication techniques. The replication can apply the changes to the multiple sites in the database system 100.

Figure 3:
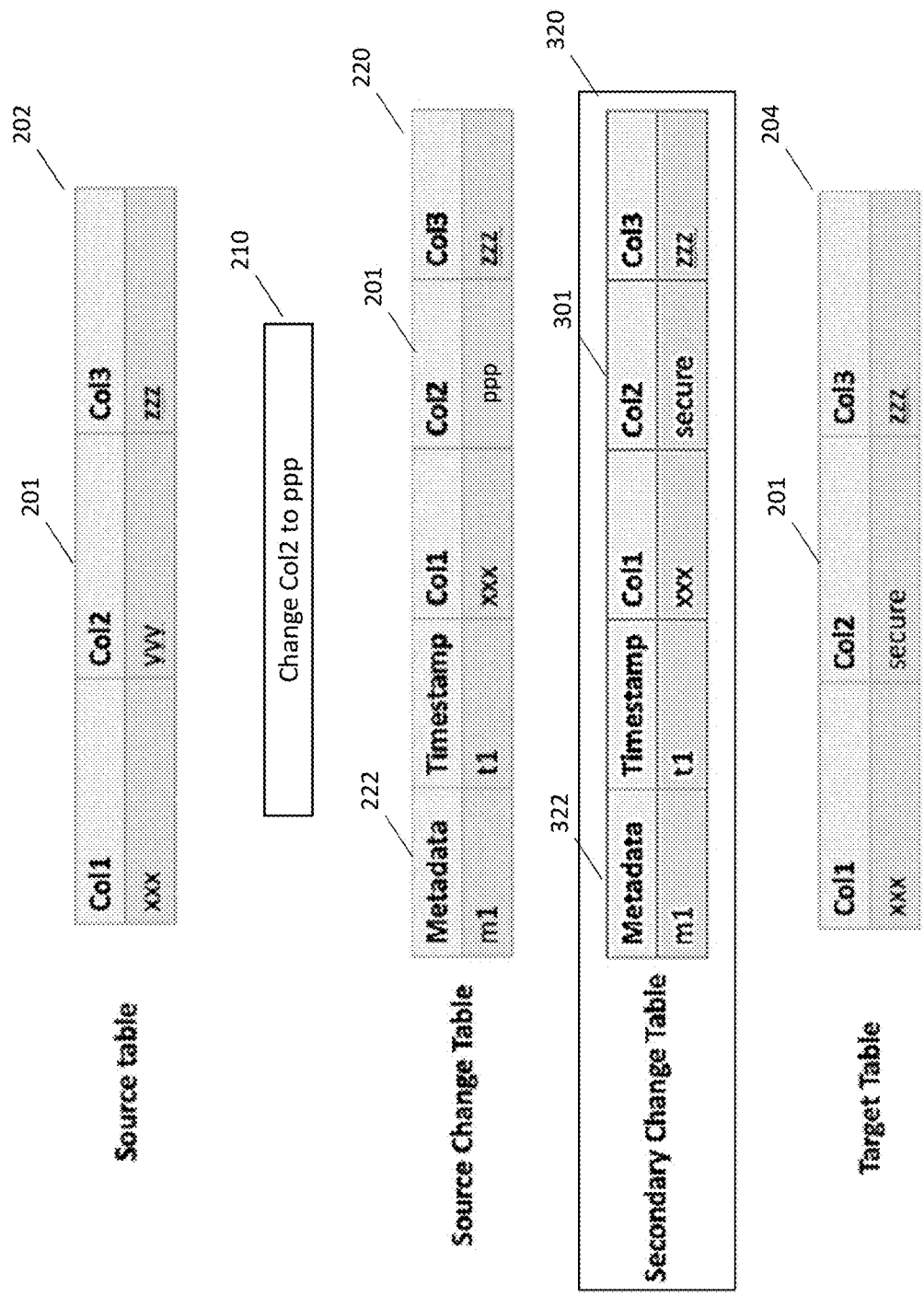
FIG. 3 depicts a block diagram of a data element in a data storage device system that securely replicates data changes according to one or more embodiments of the present invention.

FIG. 3 depicts a block diagram and operational flow for changing a data element in a data storage device in a secure manner according to one or more embodiments of the present invention. Implementing techniques described in FIG. 3 improves the security of the data stored in the database system 100. Consider the same example scenario again, where the data element 201 is a field being updated by the change instruction 210 from "yyy" to "ppp."

Embodiments of the present invention create a copy of the change-table 220; the copy is referred to as a "secondary change-table" 320 herein; however, the copy can be referred to by any other term in other embodiments of the present invention. The secondary change-table 320 only includes those update-records from the first change-table 220 that have not yet been applied. In one or more embodiments of the present invention, the secondary change-table 320 is created periodically, at a predetermined frequency, such as every 10 seconds, every 2 minutes, or any other frequency.

Creating the secondary change-table 320 can include deleting an existing instance of the secondary change-table 320 and creating a new instance of the secondary change-table 320. In one or more embodiments of the present invention, when creating an instance of the secondary change-table 320, the database system 100 checks the timestamp of the update record in the first change-table 220. The timestamp in an update record indicates when that update record was created. Using the timestamp, only those update-records that have been created within a predetermined duration from the present time, when the instance is being created, are copied into the instance of the secondary change-table 320.

When the instance of the secondary change-table 320 is being made, the data element identifiers, for example, column names, are examined to determine if the data that is in the first change-table 220 is to be secured. A user/administrator can specify which data elements are to be secured. For example, such specifications can be stored in the user settings of the database system 100. Accordingly, the database system 100 checks the settings to determine if any of the data elements in the first change-table 220 are to be secured. If there are any data elements to be secured, for example, the data element 201, while making the copy of the data elements into the secondary change-table 320, the identified data elements, are secured, and the secured data is stored in a data element 301 in the secondary change-table 320. The secondary change-table 320 is then used to apply changes to the data elements in the target table 204.

There can be several approaches for generating secure data when copying values of the data element from the update-records in the first change-table 220 to the update-records in the secondary change-table 320. For example, the secure data can be created with a security operation that is reversible. In this case, the data value can be encrypted, and the resulting ciphertext can include security metadata that facilitates reverting the ciphertext to the original data value. The security metadata is stored in the metadata 322 in the secondary change-table 320. Alternatively, or in addition, the database system 100 stores the security metadata in other locations on the servers. The database system 100 tracks such related information with the secondary change-table 320, so that the data value can be interpreted at a later point to restore it from the ciphertext that is generated by the security function. To facilitate storing the ciphertext, in one or more embodiments of the present invention, the database system 100 changes the schema of the data elements between the first change-table 220 and the secondary change-table 320. The schema change is required because the securing operation changes the format of the data value that is stored in the original field to the type of data value of the ciphertext. The "format" of data can be a field-type associated with the data element, for example, text, number, date, etc. The format is selected from a list of data types provided by the database system 100.

Other examples of securing the data value can include format preserving methods, such as masking, redactions, randomization, etc. In these cases, the schema of the data element being secured remains unchanged between the first change-table 220 and the secondary change-table 320. These securing techniques do not change the format of the data value, rather change the value of the data that is stored using a specific ciphering formula. Deciphering the original data from the secured data can include applying a reverse of the ciphering formula.

After such securing, the secondary change-table 320 has a potentially modified schema and secured data rather than clear, i.e., non-secured data, in the original form. Updating the data in the database includes performing an "apply process" that pulls changes from the secondary change-table 320 (rather than the first change-table 220) and applies the changes to the target table 204. The target table 204 now contains secure data from the secondary change-table 320. When users request a read from the target table 204, the secured data is retrieved, which then is processed by deciphering the retrieved data. The deciphering can be performed by a central system, such as the database system 100, or another security server (not shown). Alternatively, the deciphering can be performed locally by a client device (not shown) at the user's end.

Figure 4:
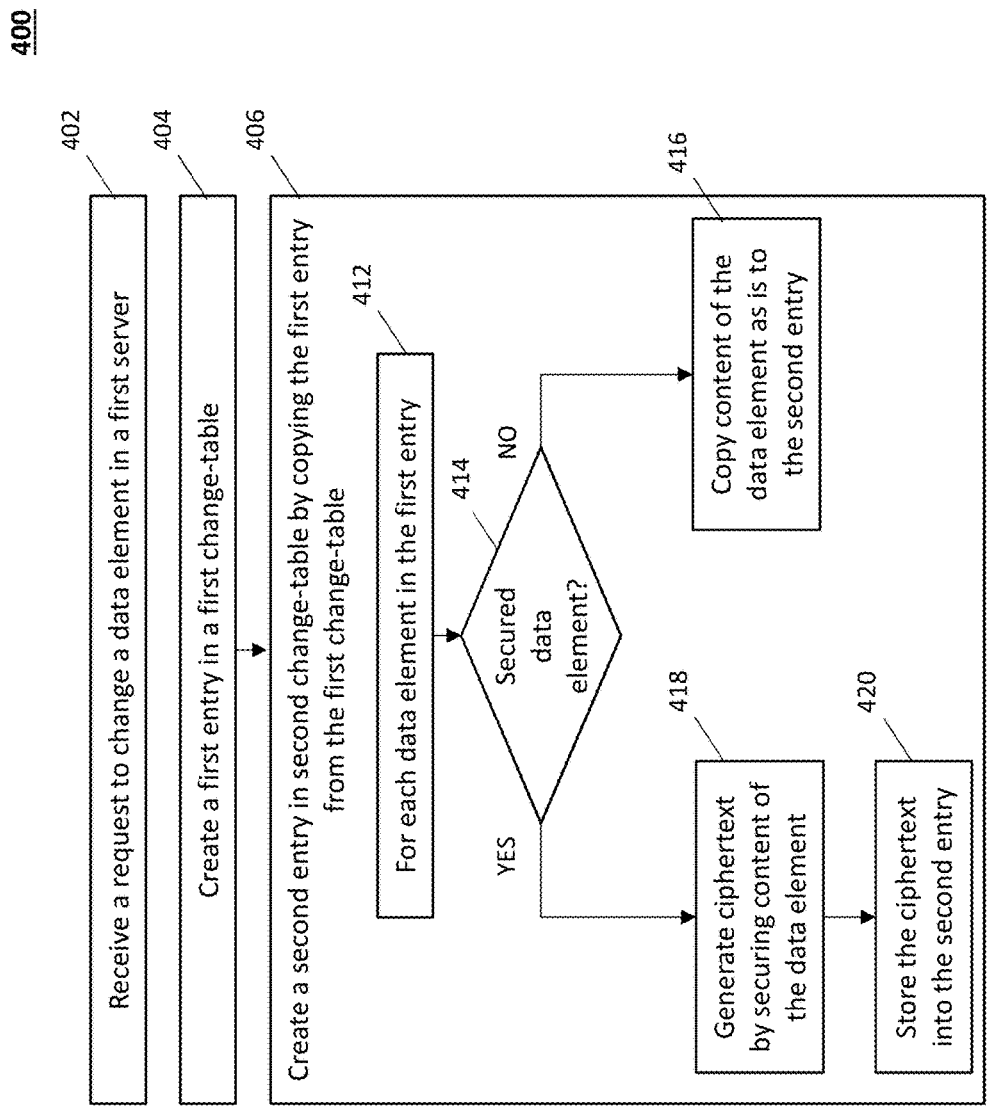
FIG. 4 depicts a flowchart of a method for securing data replication in distributed data storage environments according to one or more embodiments of the present invention

FIG. 4 depicts a flowchart of a method 400 for securing data replication in distributed data storage environments according to one or more embodiments of the present invention. The method 400 can be executed by one or more processing units that are part of the database system 100. The method 400 includes receiving an instruction 210 to change a data element in the first data storage device 102, at block 402. The instruction 210 can be in the form of a computer-executable instruction, such as using a structured query language (SQL) or other such programming languages. Further description of the flowchart is provided using the example scenario that is described herein with respect to the change instruction 210 in FIG. 2 and FIG. 3.

An entry in the first change-table 220 is created in response to the instruction 210 that is received, at block 404. The entries in the first change-table 220 include update-records that are to be applied to the source table 202. Each entry includes data elements that are to be updated from the source table 202. The database also includes a target table 204 in which the changes from the first change-table 220 are applied. The target table 204 is then used for responding to subsequent queries.

The method 400 further includes creating a copy of the entry from the first change-table 220 in the secondary change-table 320, at block 406. The copy is created only for an entry that is new, i.e., with a timestamp that indicates that the entry is created after the last iteration of copying entries from the first change-table 220. As noted earlier, entries from the first change-table 220 are copied into the secondary change-table 320 at a predetermined frequency. In one or more embodiments of the present invention, making such copies can be manually initiated by an administrator/user.

Creating the copy includes determining whether the data element 201 that is being changed is a secured data element, at block 414. For example, the data element 201, such as a row, or a field, or a column, can be secured by using an encryption key, a redaction (e.g., a mask), a randomization algorithm, or any other securing algorithm. Alternatively, the data element 201 may not be secured. The user settings associated with the first data storage device 102 can include information on whether the data element 201 is secured. Alternatively, or in addition, the user settings can be associated with a database that is stored in the first data storage device 102, the database including the source table 202 of which the data element 201 is a part. The database system 100 can check whether the data element 201 is secured based on the user settings. Alternatively, or in addition, the database system 100 can determine the security of the data element 201 based on the metadata of the data element 201.

If the data element 201 is not secured, a copy of the data element 301 is made in the entry in the secondary change-table 320 as is, i.e., without securing the content of the data element, at block 416. Alternatively, if the data element 201 is secured, the content of the data element 301 is secured using a securing algorithm, which results in ciphertext, at block 418. The ciphertext is then stored in the entry in the secondary change-table 320, at block 420. The copy of the data element 301 in the secondary change-table 320 is created in this manner by checking and copying the content of each data element in the first entry from the first change-table 220, at block 412.

Figure 5:
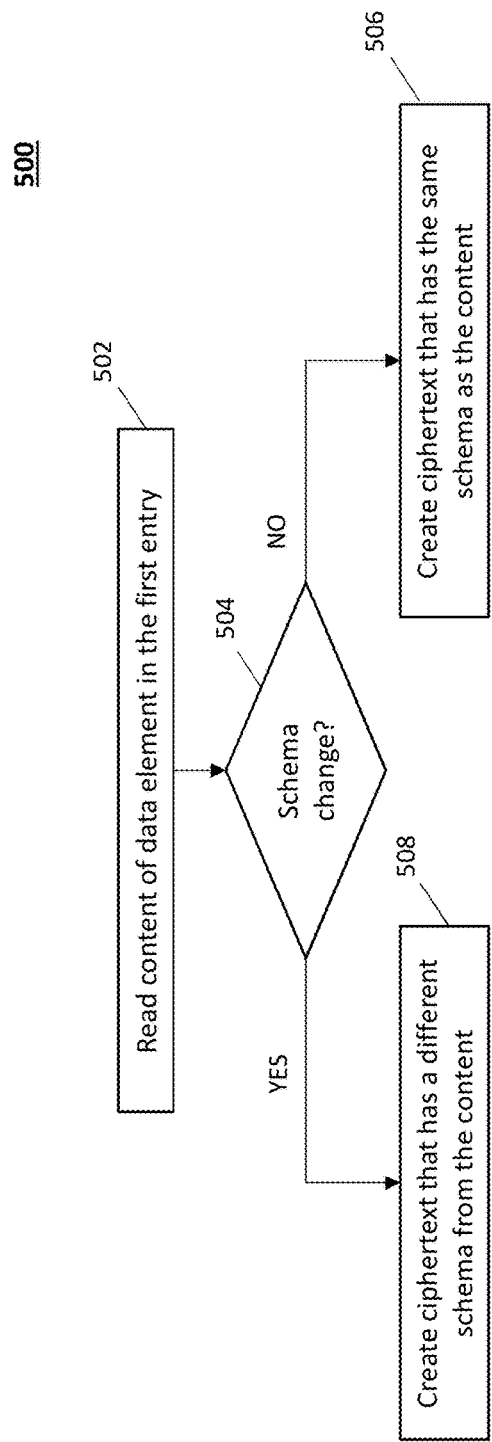
FIG. 5 depicts a flowchart of a method for securing a data element when copying from first entry to a second entry according to one or more embodiments of the present invention.

FIG. 5 depicts a flowchart of a method for securing a data element when copying from first entry to a second entry according to one or more embodiments of the present invention. The method 500 includes reading the content of the data element from the first entry from the first change-table 220, at block 502. Once it has been determined that the content is to be secured, the method 500 further includes determining whether the securing includes a schema/format change of the content or not, at block 504.

If format-preserving security is to be applied, the content of the data element from the first entry is transformed into ciphertext using a schema-preserving securing algorithm, at block 506. Examples of format-preserving security algorithms can include masking, redacting, randomizing characters/elements of the content, or any other such algorithms. In this case, the schema remains unchanged between the content of the data element from the first entry and the ciphertext that is stored in the secondary change-table 320. In turn, the schema of the first change-table 220 and that of the secondary change-table 320 remain unchanged.

In the case where format-preserving security is not applied, the content of the data element from the first entry is transformed into ciphertext using a securing algorithm that may not preserve the format, at block 508. Accordingly, the ciphertext created in this case has a different, i.e., distinct schema from that of the content in the data element from the first entry. For example, the securing algorithm, in this case, can be an encryption algorithm that generates the ciphertext that can include character types that may not be included in the original content in the first entry.

In one or more embodiments of the present invention, the ciphertext can be created where the operation is reversible. In this case, the original content is encrypted, and the resulting ciphertext can include security-metadata. Alternatively, the database system 100 tracks the security-metadata, such that the ciphertext can be interpreted at a later point to restore the original content. In turn, the database system 100 changes the schema between the first change-table 220 and the secondary change-table 320, as the securing operation changes the type of the data element field.

Embodiments of the present invention facilitate creating secure data in a replicated table based on policy and database schema by having a secondary change capture table, which contains secured data. Further, embodiments of the present invention facilitate creating the secondary change capture table based on the original change capture table. A copy method is performed that includes checking data elements, such as column names, to identify fields for which secure elements are to be created in the secondary change table. Further yet, embodiments of the present invention facilitate applying changes from the secondary change capture table, with the secured data, to a new table, where queries to the database system are run against the new table, and in turn against secure data.

Figure 6:
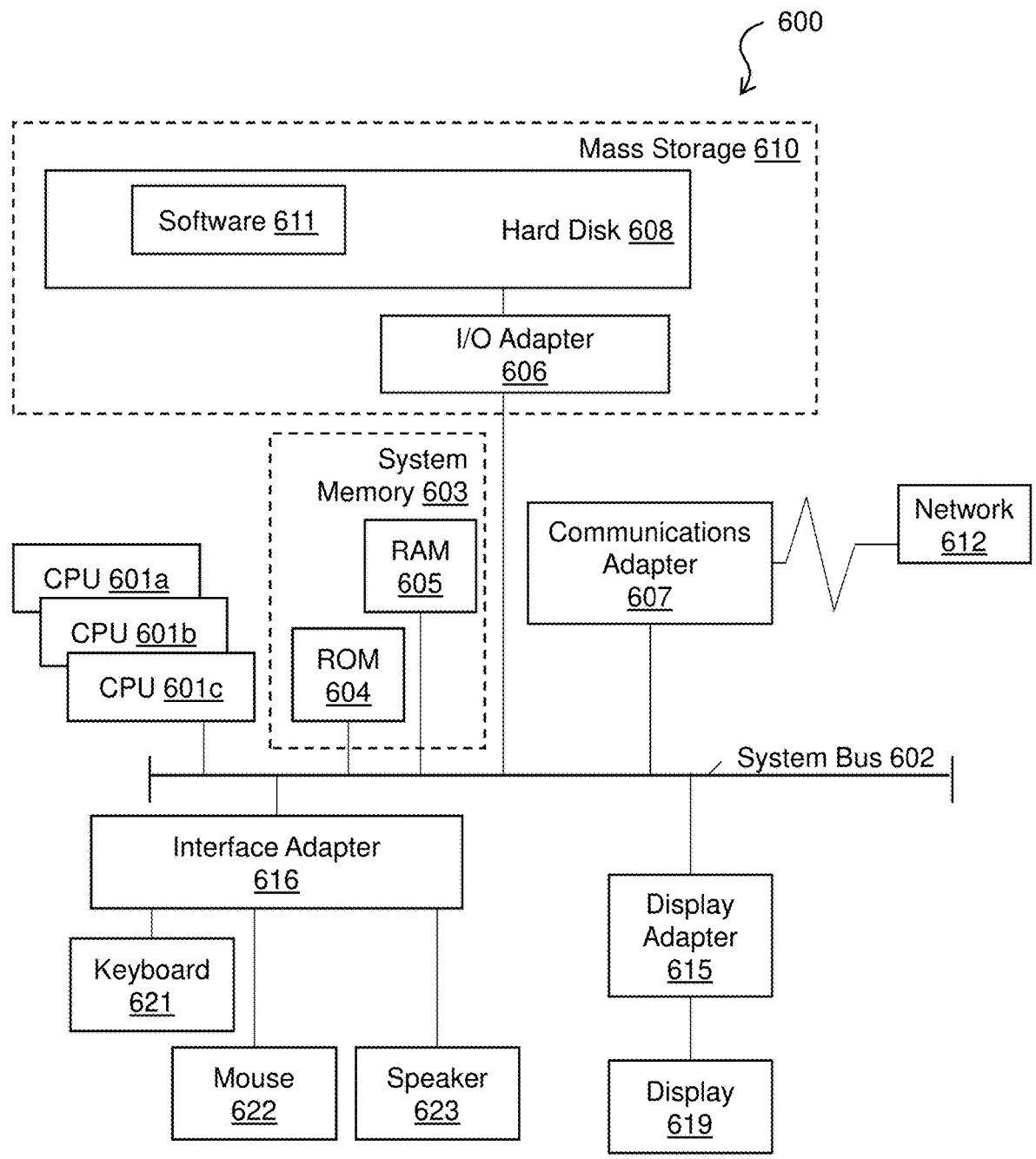
FIG. 6 is a schematic diagram of an illustrative computing device configured to implement one or more example embodiments of the invention.

Turning now to FIG. 6, a computer system 600 is generally shown in accordance with an embodiment. The computer system 600 is part of the database system 100 and the database system 100 and facilitates executing methods described herein. The computer system 600 is responsible for handling/providing the various functionalities of the database system 100 or the database system 100. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to system memory 603 and various other components. The system memory 603 can include a read-only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read-only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described hereinbelow with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics-intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external web server or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
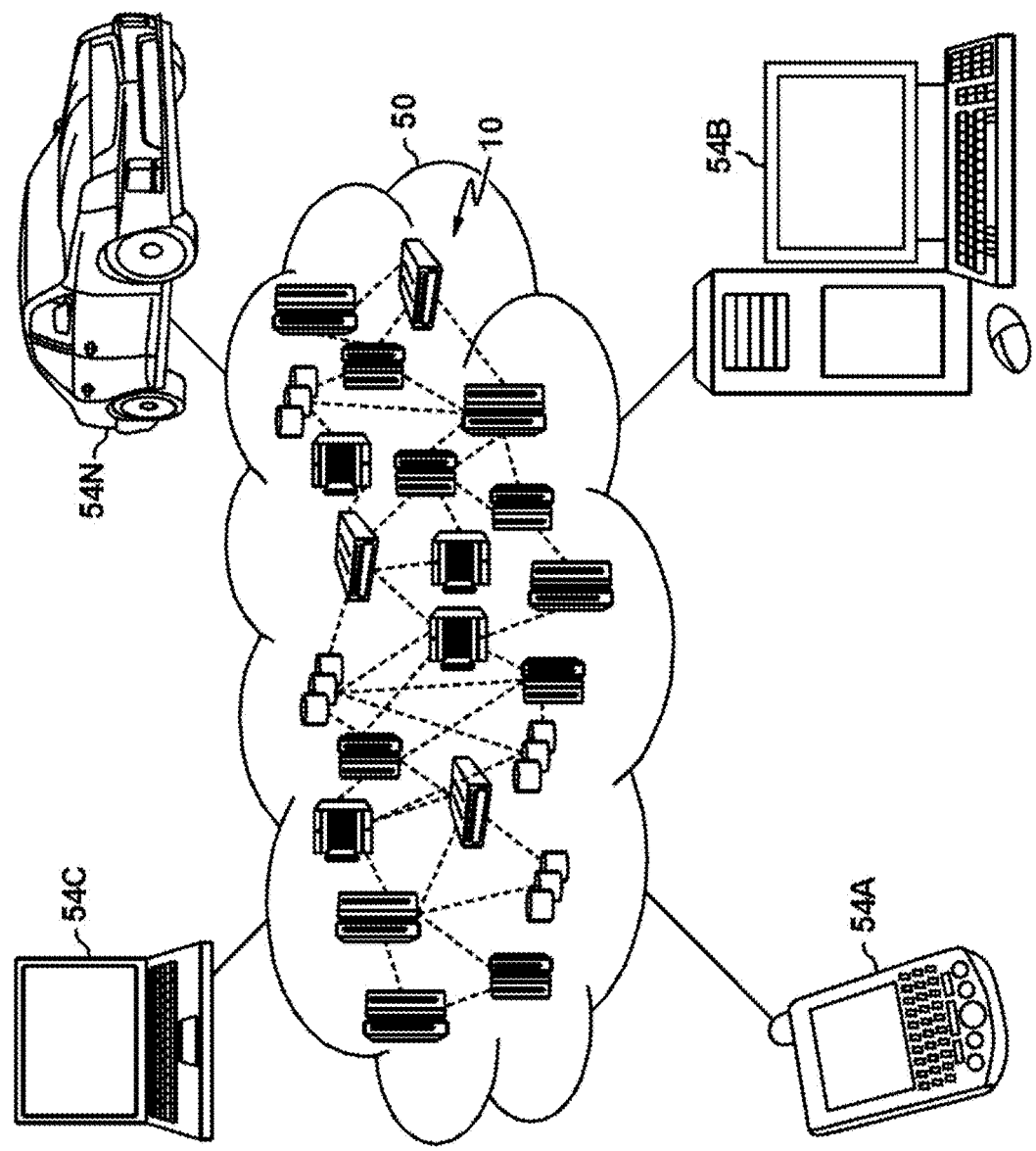
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
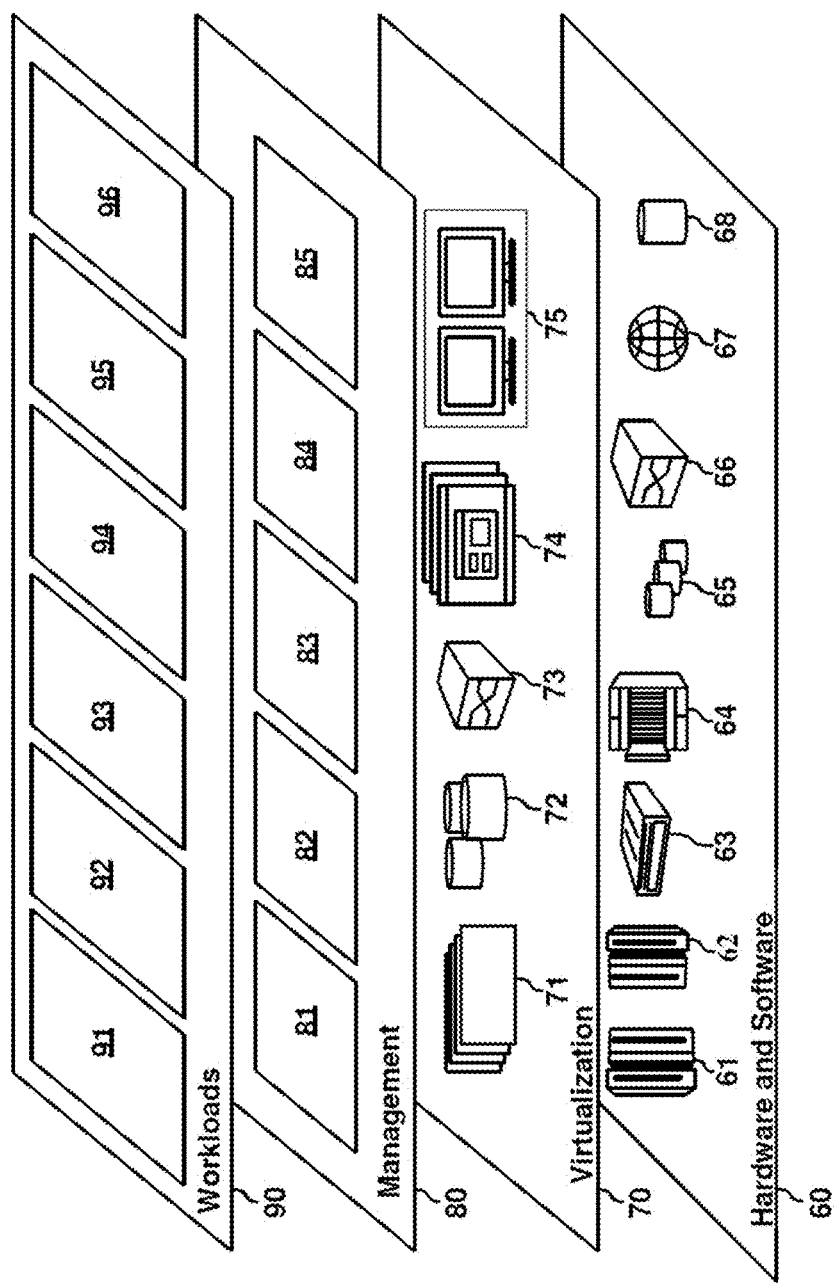
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data replication 96.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or another device to cause a series of operational steps to be performed on the computer, other programmable apparatus or another device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for secure data replication in data storage environments, the method comprising:
   receiving, by a database system, an instruction to change a first data element from a first row in a table that is in a database, the database comprising a first copy of the table and a second copy of the table; and
   performing, by the database system, in response to the receiving:
      creating a first entry in a first change-table, the first change-table comprises update-records that are to be applied to the first copy of the table, the first entry including an updated value provided by the instruction to apply to the first data element in the first copy of the table;
      creating a second entry in a second change-table, the second change-table comprises update-records that are to be applied to the second copy of the table, the second entry corresponding to the first entry, and wherein the creating the second entry comprising:
         in response to determining that the first data element is a secured data element, changing the updated value from the first entry into a ciphertext using a security algorithm, and storing the ciphertext into the second entry as content of the first data element in the second change-table, instead of the updated value; and
         in response to determining that the first data element is a non-secured data element, storing the updated value into the second entry as content of the first data element of the second change-table without securing the updated value; and
      modifying, by the database system, the second copy of the table based on security of the first data element according to the instruction that is received using the second change-table, wherein the second copy of the table is used to respond to subsequent queries.

2. The method of claim 1, wherein the first data element is determined to be secured based on settings of the database.

3. The method of claim 1, wherein the first entry further comprises a timestamp that indicates when the first entry was created.

4. The method of claim 3, wherein the second entry is created as part of a periodic update to the table, and wherein the second entry is created in response to the timestamp indicating that the first entry was created after the most recent periodic update.

5. The method of claim 1, wherein converting the updated value to the ciphertext comprises changing the updated value using a format preserving security algorithm.

6. The method of claim 1, wherein converting the updated value to the ciphertext comprises changing a format of the updated value, wherein a schema of the first change-table is distinct from a schema of the second change-table.

7. The method of claim 1, wherein converting the updated value to the ciphertext comprises storing security metadata that can revert the ciphertext back to the updated value.

8. The method of claim 7, wherein the security metadata is stored in the second change-table.

9. A database system comprising:
   a memory device; and
   one or more processors coupled with the memory device, the one or more processors configured to perform a method for secure data replication in a database, the database comprising a first copy of a table and a second copy of the table, and the method comprising:
      receiving an instruction to change a first data element in the table; and
      performing, in response to the receiving:
         creating a first entry in a first change-table, the first entry comprises a plurality of data elements including an updated value provided by the instruction to apply to the first data element;
         creating a second entry in a second change-table, the creating the second entry comprising:
            in response to determining that the first data element is a secured data element, changing the updated value from the first entry into a ciphertext using a security algorithm, and storing the ciphertext into the second entry as content of the first data element in the second change-table, instead of the updated value; and
            in response to determining that the first data element is a non-secured data element, storing the updated value into the second entry as content of the first data element of the second change-table without securing the updated value; and
         modifying the second copy of the table according to the instruction that is received using the second change-table, wherein the second copy of the table is used to respond to subsequent queries.

10. The system of claim 9, wherein the first data element is determined to be secured based on settings of the database.

11. The system of claim 9, wherein the first entry further comprises a timestamp that indicates when the first entry was created.

12. The system of claim 11, wherein the second entry is created as part of a periodic update to the table, and wherein the second entry is created in response to the timestamp indicating that the first entry was created after the most recent periodic update.

13. The system of claim 9, wherein converting the updated value to the ciphertext comprises changing the updated value using a format preserving security algorithm.

14. The system of claim 9, wherein converting the updated value to the ciphertext comprises changing a format of the updated value, wherein a schema of the first change-table is distinct from a schema of the second change-table.

15. The system of claim 9, wherein converting the updated value to the ciphertext comprises storing security metadata that can revert the ciphertext back to the updated value.

16. The system of claim 15, wherein the security metadata is stored in the second change-table.

17. A computer program product comprising a non-transitory storage medium readable by one or more processing circuits, the storage medium storing instructions executable by the one or more processing circuits to perform a method for secure data replication in a database, the database comprising a first copy of a table and a second copy of the table, the method comprises:
    receiving an instruction to change a first data element in the table, and in response:
        creating a first entry in a first change-table, the first entry comprises a plurality of data elements including an updated value provided by the instruction to apply to the first data element;
        creating a second entry in a second change-table, the creating the second entry comprising:
            in response to determining that the first data element is a secured data element, changing the updated value from the first entry into a ciphertext using a security algorithm, and storing the ciphertext into the second entry as content of the first data element in the second change-table, instead of the updated value; and
            in response to determining that the first data element is a non-secured data element, storing the updated value into the second entry as content of the first data element of the second change-table without securing the updated value; and
        modifying the second copy of the table according to the instruction that is received using the second change-table, wherein the second copy of the table is used to respond to subsequent queries.

18. The computer program product of claim 17, wherein the first data element is determined to be secured based on settings of the database.

19. The computer program product of claim 17, wherein the first entry further comprises a timestamp that indicates when the first entry was created, and wherein the second entry is created as part of a periodic update to the table, and wherein the second entry is created in response to the timestamp indicating that the first entry was created after the most recent periodic update.

20. The computer program product of claim 17, wherein converting the updated value to the ciphertext comprises changing a format of the updated value, wherein a schema of the first change-table is distinct from a schema of the second change-table.

* * * * *